US008122014B2

(12) United States Patent
Brindley et al.

(10) Patent No.: US 8,122,014 B2
(45) Date of Patent: Feb. 21, 2012

(54) LAYERED AUGMENTATION FOR WEB CONTENT

(75) Inventors: Richard Brindley, Buckinghamshire (GB); Craig Allen Gooding, London (GB); Anna Kassoway, New York, NY (US)

(73) Assignee: Vibrant Media, Inc., London (GB)

( * ) Notice: Subject to any disclaimer, the term of this patent is extended or adjusted under 35 U.S.C. 154(b) by 455 days.

(21) Appl. No.: 12/233,540

(22) Filed: Sep. 18, 2008

(65) Prior Publication Data

US 2009/0019039 A1    Jan. 15, 2009

Related U.S. Application Data

(63) Continuation-in-part of application No. 11/779,254, filed on Jul. 17, 2007, now Pat. No. 7,698,311, which is a continuation of application No. 10/645,313, filed on Aug. 20, 2003, now Pat. No. 7,257,585.

(60) Provisional application No. 60/484,818, filed on Jul. 2, 2003.

(51) Int. Cl.
  *G06F 17/30* (2006.01)

(52) U.S. Cl. ........ 707/722; 707/803; 715/234; 715/809; 709/203; 705/14.4

(58) Field of Classification Search .................. 707/722, 707/803, 999.1; 715/234, 809; 709/203; 705/14.4
See application file for complete search history.

(56) References Cited

U.S. PATENT DOCUMENTS

| 5,204,947 A | 4/1993 | Bernstein et al. |
| 5,251,294 A | 10/1993 | Abelow |
| 5,297,249 A | 3/1994 | Bernstein et al. |
| 5,603,025 A | 2/1997 | Tabb et al. |
| 5,694,594 A | 12/1997 | Chang |

(Continued)

FOREIGN PATENT DOCUMENTS

EP    0778534 A1    6/1997

(Continued)

OTHER PUBLICATIONS

Andreessen, M., "Two ideas . . . ", Dec. 14, 1992, [online][Retrieved on Feb. 6, 2001] Retrieved from the Internet <URL:http://lists.w3.org/Archives/Public/www-talk/1992NovDec/0207.html>.

(Continued)

*Primary Examiner* — Cheryl Lewis
(74) *Attorney, Agent, or Firm* — Foley & Lardner, LLP; Christopher J. McKenna (57) ABSTRACT

Embodiments of the present disclosure include methods (and corresponding systems and computer program products) that augment content in web pages with resources and provide the resources based on user interaction with the augmented content in the web pages. The disclosed embodiments analyzes a web page to identify a keyword, locates a piece of reference data matching the identified keyword, generates an association of the located piece of reference data and the keyword, and embeds the association in an augmented web page. Upon receiving a request from a client computer corresponding to a pointer being positioned over the keyword in the augmented web page, the disclosed embodiments determines relevant resources, and transmits the resources to the client computer for display in a multi-layered dialog box, such that a viewer can access the plurality of resources by interacting with the multi-layered dialog box without leaving the augmented web page.

11 Claims, 10 Drawing Sheets

U.S. PATENT DOCUMENTS

| | | | |
|---|---|---|---|
| 5,708,825 | A | 1/1998 | Sotomayor |
| 5,751,961 | A | 5/1998 | Smyk |
| 5,781,914 | A | 7/1998 | Stork et al. |
| 5,794,257 | A | 8/1998 | Liu et al. |
| 5,799,292 | A | 8/1998 | Hekmatpour |
| 5,815,830 | A | 9/1998 | Anthony |
| 5,822,539 | A | 10/1998 | van Hoff |
| 5,838,906 | A | 11/1998 | Doyle et al. |
| 5,857,181 | A | 1/1999 | Augenbraun et al. |
| 5,903,889 | A | 5/1999 | De La Huerga et al. |
| 5,948,061 | A | 9/1999 | Merriman et al. |
| 5,963,205 | A | 10/1999 | Sotomayor |
| 5,991,809 | A | 11/1999 | Kriegsman |
| 5,999,912 | A | 12/1999 | Wodarz et al. |
| 5,999,929 | A | 12/1999 | Goodman |
| 6,009,410 | A | 12/1999 | LeMole et al. |
| 6,044,405 | A | 3/2000 | Driscoll, III et al. |
| 6,047,310 | A | 4/2000 | Kamakura et al. |
| 6,092,074 | A | 7/2000 | Rodkin et al. |
| 6,098,081 | A | 8/2000 | Heidorn et al. |
| 6,108,703 | A | 8/2000 | Leighton et al. |
| 6,185,598 | B1 | 2/2001 | Farber et al. |
| 6,205,432 | B1 | 3/2001 | Gabbard et al. |
| 6,256,631 | B1 | 7/2001 | Malcolm |
| 6,285,987 | B1 | 9/2001 | Roth et al. |
| 6,434,567 | B1 | 8/2002 | De La Huerga |
| 6,434,657 | B1 | 8/2002 | Brown |
| 6,516,321 | B1 | 2/2003 | De La Huerga |
| 6,523,022 | B1 * | 2/2003 | Hobbs .................................. 1/1 |
| 6,546,397 | B1 | 4/2003 | Rempell |
| 6,574,644 | B2 | 6/2003 | Hsu et al. |
| 6,578,078 | B1 * | 6/2003 | Smith et al. ................... 709/224 |
| 6,581,065 | B1 | 6/2003 | Rodkin et al. |
| 6,606,652 | B1 | 8/2003 | Cohn et al. |
| 6,658,623 | B1 | 12/2003 | Schilit et al. |
| 6,748,385 | B1 | 6/2004 | Rodkin et al. |
| 6,772,139 | B1 | 8/2004 | Smith |
| 6,907,566 | B1 | 6/2005 | McElfresh et al. |
| 6,928,452 | B2 | 8/2005 | De La Huerga |
| 7,003,719 | B1 | 2/2006 | Rosenoff et al. |
| 7,010,742 | B1 | 3/2006 | Hsu et al. |
| 7,257,585 | B2 | 8/2007 | Stevenson et al. |
| 7,437,725 | B1 | 10/2008 | Chang et al. |
| 7,496,943 | B1 | 2/2009 | Goldberg et al. |
| 7,933,893 | B2 | 4/2011 | Walker et al. |
| 2002/0065136 | A1 | 5/2002 | Day |
| 2002/0143808 | A1 | 10/2002 | Miller et al. |
| 2005/0091111 | A1 | 4/2005 | Green et al. |
| 2005/0125397 | A1 | 6/2005 | Gross et al. |
| 2005/0131884 | A1 | 6/2005 | Gross et al. |
| 2005/0262428 | A1 | 11/2005 | Little et al. |
| 2006/0064411 | A1 | 3/2006 | Gross et al. |
| 2006/0248078 | A1 | 11/2006 | Gross et al. |
| 2006/0282416 | A1 | 12/2006 | Gross et al. |
| 2007/0050711 | A1 | 3/2007 | Walker et al. |
| 2008/0195603 | A1 | 8/2008 | Gross et al. |
| 2009/0031311 | A1 | 1/2009 | Chang et al. |
| 2009/0171750 | A1 | 7/2009 | Zhou et al. |
| 2009/0171751 | A1 | 7/2009 | Zhou et al. |

FOREIGN PATENT DOCUMENTS

| | | |
|---|---|---|
| EP | 0810520 A1 | 12/1997 |
| WO | WO 97/21183 A1 | 6/1997 |
| WO | WO 98/34168 A2 | 8/1998 |
| WO | WO 01/42947 A2 | 6/2001 |
| WO | WO 01/86390 | 11/2001 |

OTHER PUBLICATIONS

Communication Pursuant to Article 96(2) EPC, European Patent Application No. 04756575.9, Dec. 12, 2006, 5 pages.
European Search Report, EP 04756575, Aug. 16, 2006, 3 pages.
Examination Report, New Zealand Patent Application No. 544469, Sep. 7, 2006, 1 page.
Notice of Preliminary Rejection, Korean Patent Application No. 10-2005-7025307, May 17, 2007, 6 pages.
PCT International Preliminary Report on Patentability, PCT Application No. PCT/US2004/021294, Jan. 12, 2006, 11 pages.
PCT International Search Report, WO 2001/086390 A3, Nov. 15, 2001, 4 pages.
PCT International Search Report and Written Opinion, PCT/US2004/021294, Mar. 4, 2005, 13 pages.
Raggett, D., "Different forms of Annotations", Nov. 23, 1992, [online][Retrieved on Feb. 6, 2001] Retrieved from the Internet <URL:http://lists.w3.org/Archives/Public/www-talk/1992NovDec/0100.html>.
U.S. Appl. No. 09/606422, filed Jun. 29, 2000, Walker.
Wyman, B., "Random Link Insertion into a Webpage," Computer Language Javascript, Sep. 25, 1996, [online] [Retrieved on Mar. 8, 2006] Retrieved from the Internet <URL:http://groups.google.com/group/comp.lang.javascript/browse_thread>.
Agosti, M. et al., "Automatic Authoring and Construction of Hypermedia for Information Retrieval," Multimedia Systems, Feb. 1995, pp. 1-19, vol. 3, No. 1, Springer Berlin.
Allan, J., "Automatic Hypertext Construction," Dissertation, Cornell University, Jan. 1995, 128 pages.
Carr, L. et al., "The Evolution of Hypertext Link Services," ACM Computing Surveys, Dec. 1999, vol. 31, No. 4, [Online] [Retrieved on Mar. 31, 2009] Retrieved from the Internet<URL: http://www.cs.brown.edu/memex/ACM_HypertextTestbed/papers/19.html>.
Carr, L. et al., "The Microcosm Link Service and its Application to the World Wide Web," In Proceedings of the First International World Wide Web Conference Geneva, 1994, pp. 1-9.
"Cisco DistributedDirector," Posted Feb. 21, 1997, 16 pages, [Online] [Retrieved on Dec. 4, 1997] Retrieved from the Internet<URL:http://www.cisco.com/wart/public/751/distdir/dd_wp.htm>.
Crestani, F. et al., "A Case Study of Automatic Authoring: from a Textbook to a Hyper-Textbook," Submitted to Elsevier Preprint, Oct. 13, 1997, pp. 1-34.
Goldszmidt, G. et al., "Load Distribution for Scalable Web Servers: Summer Olympics 1996—A Case Study," 10 pages.
Holm, R., "A Trip Down Hypermedia Lane," Linux Gazette, May 2002, Issue 78, [Online] [Retrieved on Mar. 31, 2009] Retrieved from the Internet<URL:http://linuxgazette.net/issue78/holm.html>.
Li, Z. et al., "Hypermedia Links and Information Retrieval," Conference, Lancaster University, 1992, pp. 1-11.
Mayfield, J. et al., "Snitch: Augmenting Hypertext Documents with a Semantic Net," International Journal of Intelligent and Cooperative Information Systems, 1993, pp. 1-17.
Thistlewaite, P., "Automatic Construction and Management of Large Open Webs," Information Processing & Management, 1997, pp. 161-173, vol. 33, No. 2.
Yang, J. et al., "From Hypertext to Flat Text: A Tool for Document Construction," AusWeb96, 1996, 9 pages.
Final Office Action related to U.S. Appl. No. 12/718,056 mailed on Jan. 19, 2011.
Jones et al. "Hands-On Hypercard: Designing Your Own Applications", John Wiley & sons, Inc.
Non Final Office Action related to U.S. Appl. No. 12/718,056 mailed on Aug. 31, 2010.
Ostroff et al."Selection Devices for User of an Electronic Encyclopedia: An Empirical Comparison of Four Possibilities" Jul. 1987, pp. 665-680.
Aaddzz Brokers Web Ad Space advertisers Publishers, 1997 (6 pages).
Adforce User Guide, Version 2.6.
Cybergold (3 pages).
Fourth Generation Hypermedia: Some Missing Links for the WWW, 1997 (35 pages).
Linkshare Launches Affiliates Profiling Software (Feb. 24, 1998).
One to One Marketing on the Internet.
Tailorability as a Link from Object Oriented Software, Jul. 1996.

* cited by examiner

LAYERED AUGMENTATION FOR WEB CONTENT

CROSS-REFERENCE TO RELATED APPLICATIONS

This application is a continuation-in-part of U.S. patent application Ser. No. 11/779,254, U.S. Pat. No. 7,698,311, entitled "Method And System For Augmenting and Tracking Web Content," by Douglas Stevenson and Craig Allen Gooding, filed on Jul. 17, 2007, which is a continuation of U.S. patent application Ser. No. 10/645,313, filed Aug. 20, 2003 as U.S. Pat. No. 7,257,585, which claims the benefit of U.S. Provisional Patent Application Ser. No. 60/484,818, filed on Jul. 2, 2003, all of which are hereby incorporated by reference in their entirety. This application is also related to U.S. patent application Ser. No. 12/033,539, U.S. Pat. No. 7,853,558, filed on Feb. 19, 2008, the content of which is hereby incorporated by reference in its entirety.

BACKGROUND

1. Field of Disclosure

The disclosure generally relates to the field of data augmentation, in particular to augmenting textual content in documents.

2. Description of the Related Art

Hypertext is commonly used to provide related (or supplemental) information in a web page. Hypertext is the organization of computer based text into connected associations enabling a user to quickly access information that the user chooses. An instance of such an association is called a hyperlink or hypertext link. A hyperlink, when selected, leads the viewer to another web page (or file or resource, collectively called the destination page).

In order to access the supplemental information provided through hyperlinks, viewers are required to leave their current web pages. This requirement interrupts the viewers' web browsing experience. As a result, most viewers are reluctant to visit the destination page provided by hyperlinks.

In addition, traditionally the hyperlinks are generated by human editors, a process that is both tedious and subject to human errors. Further, by the time a viewer tries to visit a destination page of a hyperlink, the destination page may cease to exist or have evolved to no longer provide the related information.

Thus, the art lacks, inter alia, a system and method for augmenting textual content in web pages with supplemental information (or resources), enabling viewers of the web pages to access the supplemental information without leaving the web pages, and maintaining the augmentation up-to-date.

SUMMARY

Embodiments of the present disclosure include methods (and corresponding systems and computer program products) that augment content in web pages with resources and provide augmented content such as relevant information and advertisements based on user interaction with the augmented content in the web pages.

The disclosed embodiments comprise analyzing a web page to identify a keyword (or a set of keywords or phrases) in the web page, locating a piece of reference data from a reference database matching the identified keyword, generating an association of the located piece of reference data and the keyword, and embedding the association in an augmented web page corresponding to the web page. Upon receiving a request from a client computer corresponding to a pointer being positioned over the keyword in the augmented web page, the disclosed embodiments determine a plurality of resources relevant to the keyword by searching for the plurality of resources using the located piece of reference data in a resource database, and transmit the plurality of resources to the client computer for display in a multi-layered dialog box, such that a viewer can access the plurality of resources by interacting with the multi-layered dialog box without leaving the augmented web page.

Advantages of the disclosed embodiments include providing content providers with additional channels for delivering relevant advertisements and other content to viewers. Because the relevant resources are presented in a multi-layered dialog box, viewers can access more relevant resources in a well-organized manner. Because the augmented data is displayed as an overlay of the current web page, the disclosed embodiments in essence establish a third dimension (e.g., a "z-axis") to present information (the first and second dimensions being the length (e.g., a "x-axis") and width (e.g., a "y-axis") of the web page), enabling viewers to access additional relevant content without leaving the current web page. This feature is beneficial for devices with limited screen space, for example, mobile computing devices (e.g., handheld computers) or conventional computer screens having many active windows that are simultaneously displayed. The disclosed embodiments also enhance viewers' web browsing experience by providing relevant content overlays without the need to leave their current web page to augment the information to provide for a user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying drawings. A brief description of the drawings is below:

DETAILED DESCRIPTION

The disclosed embodiments describe examples of a method (and corresponding system and computer program product) for augmenting files with related resources through layered augmentation. Viewers of the augmented files can access the related resources through a multi-layered dialog box. The process of providing additional resources through multi-layered dialog box and the multi-layered dialog box are collectively called layered augmentation.

The method identifies data in a file, associates the identified data with reference data in a reference database, and stores the associations in a corresponding augmented file. A viewer of the augmented file can access resources related to a piece of augmented data through layered augmentation. When the viewer moves a pointer over the piece of augmented data (also called mouse-over), the related resources are provided in a multi-layered dialog box. The dialog box is overlaid on the augmented file approximate to the position where the mouse-over occurred. The viewer can navigate through the related resources in the dialog box without leaving the augmented file.

As described herein, a file includes any types of documents such as web pages. Augmented data, the data with integrated association in an augmented file, include any types of content such as text and image. Resources provided through layered augmentations include textual content, visual content such as images and videos, interactive controls such as dialog boxes, and services such as Internet search service and advertisement. A pointer can be any pointer device such as a mouse, a trackball, a roller, and a touchpad. For purposes of illustration, the method (and corresponding system and computer program product) is described in terms of augmenting keywords (or key phrases) in web pages and delivering related advertisements through multi-layered dialog boxes based on user interactions with the augmented keywords, even though the disclosed embodiments apply to all other types of content, files, and resources as defined above.

The figures and the following description relate to preferred embodiments by way of illustration only. Reference will now be made in detail to several embodiments, examples of which are illustrated in the accompanying figures. The figures depict embodiments of the disclosed system (or method) for purposes of illustration only. It should be noted that from the following discussion, alternate embodiments of the structures and methods disclosed herein will be readily recognized by one skilled in the art as viable alternatives that may be employed without departing from the principles described herein.

Overview of Computing Environment

Figure 1:
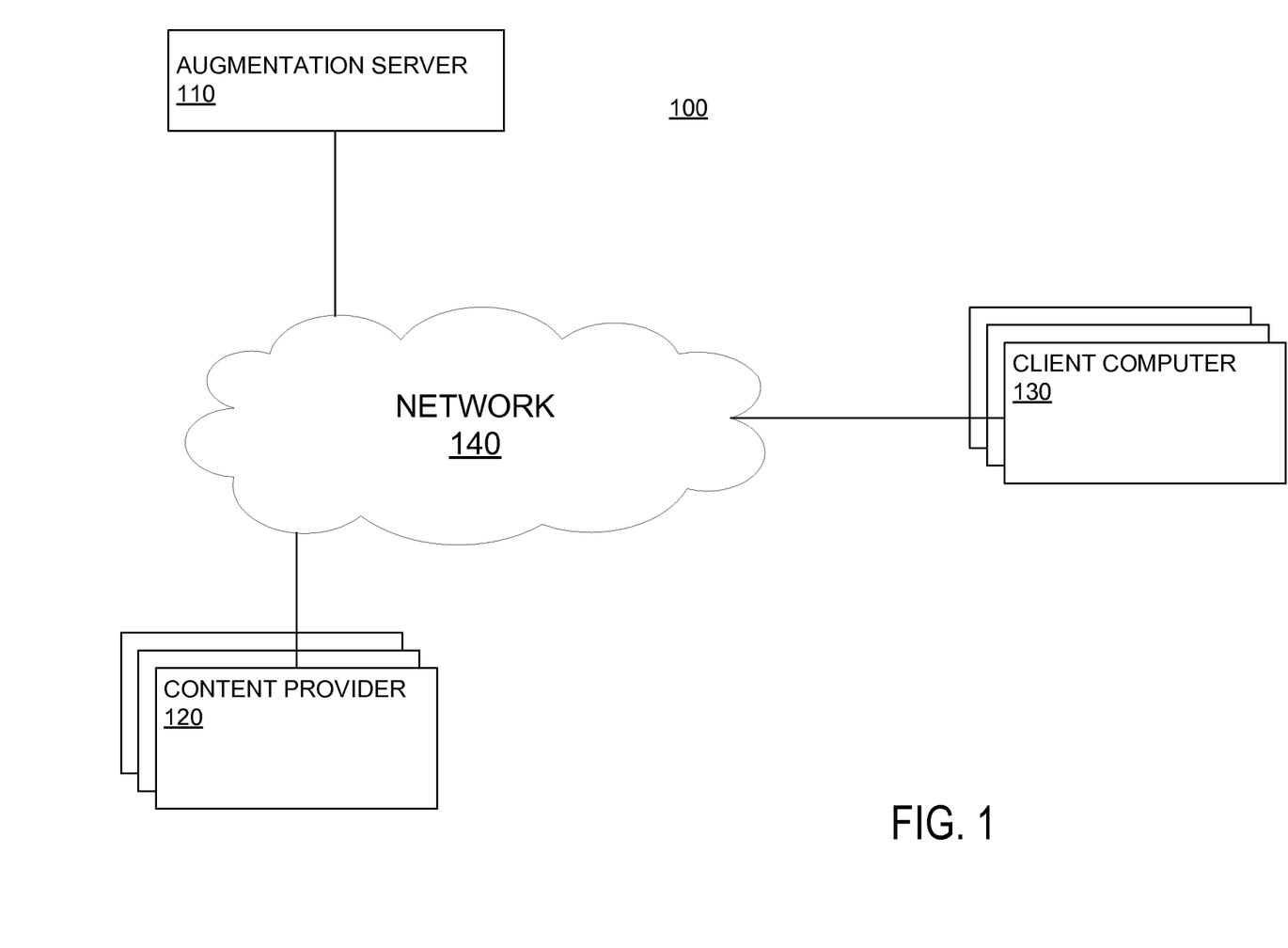
FIG. 1 is a block diagram illustrating one embodiment of a computing environment for augmenting source data files with layered augmentation.

FIG. 1 illustrates one embodiment of a computing environment 100 for augmenting web pages and providing viewers of the augmented web pages with related advertisements through layered augmentation based on user interaction. As illustrated, the computing environment 100 includes an augmentation server 110, multiple content providers (or websites) 120, and one or more client computers (or user systems) 130, all of which are communicatively coupled through a network 140.

The augmentation server 110 is configured to augment keywords (or other types of content) in web pages (or other types of documents) with advertisements (or other types of resources), and deliver the advertisements based on user interaction with the augmented keywords. The augmentation server 110 retrieves web pages from the content providers 120 and augments the web pages. The augmentation server 110 augments a web page by identifying keywords in the web page, associating (or tagging) the keywords with one or more related references in a reference database, generating an augmented web page, and storing the associations in a database. When a user views an augmented web page in a client computer 130 and moves a pointer over one of the augmented keywords (hereinafter "the activated keyword"), the augmentation server 110 displays (or avails) related advertisements in the client computer 130 through a multi-layered dialog box.

An example architecture of the augmentation server 110 is described in detail below with respect to FIG. 2.

The content providers 120 are entities that provide (or generate), host, publish, control, or otherwise have rights over a collection of web pages (or other types of documents). In one embodiment, the content providers 120 are web servers hosting web pages for viewers to access. The content providers 120 may provide web pages to the augmentation server 110 for layered augmentation. Alternatively, the content providers 120 may either instruct or give permission to the augmentation server 110 to retrieve all or parts of their web pages for layered augmentation.

The client computers 130 are client devices for users to browse web pages (or other types of documents). In one embodiment, a client computer 130 includes a pointer device (e.g., a mouse, a trackball, a roller, a touchpad, or the like), a conventional web browser (e.g., Microsoft Internet Explorer™, Mozilla Firefox™, or Apple Safari™), and can retrieve and display web pages from the content providers 120 in a conventional manner (e.g., using the HyperText Transfer Protocol). In one embodiment, the client computer 130 displays augmented keywords in an augmented web page differently than the non-augmented content. For example, the augmented keywords can be displayed in a double underline style and/or in a color distinctive from texts that are not augmented. When a user moves a pointer (e.g., mouse pointer) over (e.g., mouse-over) an augmented keyword in the augmented web page, the client computer 130 (or the utilized web browser) generates a request and transmits the request to the augmentation server 110. The augmentation server 110 receives the request and determines relevant advertisements to transmit to the client computer 130. The client computer 130 (or the utilized web browser) displays the advertisements retrieved from the augmentation server 110 in a multi-layered dialog box overlaying the augmented web page and proximate to the location where the mouse-over occurred. The multi-layered dialog box displays an advertisement and multiple clickable tabs representing the other retrieved advertisements. The viewer can select (e.g., click) a tab to request the dialog box to display the corresponding advertisement. The viewer may navigate among the multiple advertisements and interact with the advertisements without leaving the augmented web page.

The network 140 is configured to communicatively connect the augmentation server 110, the content providers 120, and the client computers 130. The network 140 may be a wired or wireless network. Examples of the network 140 include the Internet, an intranet, a WiFi network, a WiMAX network, a mobile telephone network, or a combination thereof.

In one embodiment, the augmentation server 110, the content providers 120, and/or the client computers 130 are structured to include a processor, memory, storage, network interfaces, and applicable operating system and other functional software (e.g., network drivers, communication protocols).

Augmentation Server Architecture

Figure 2:
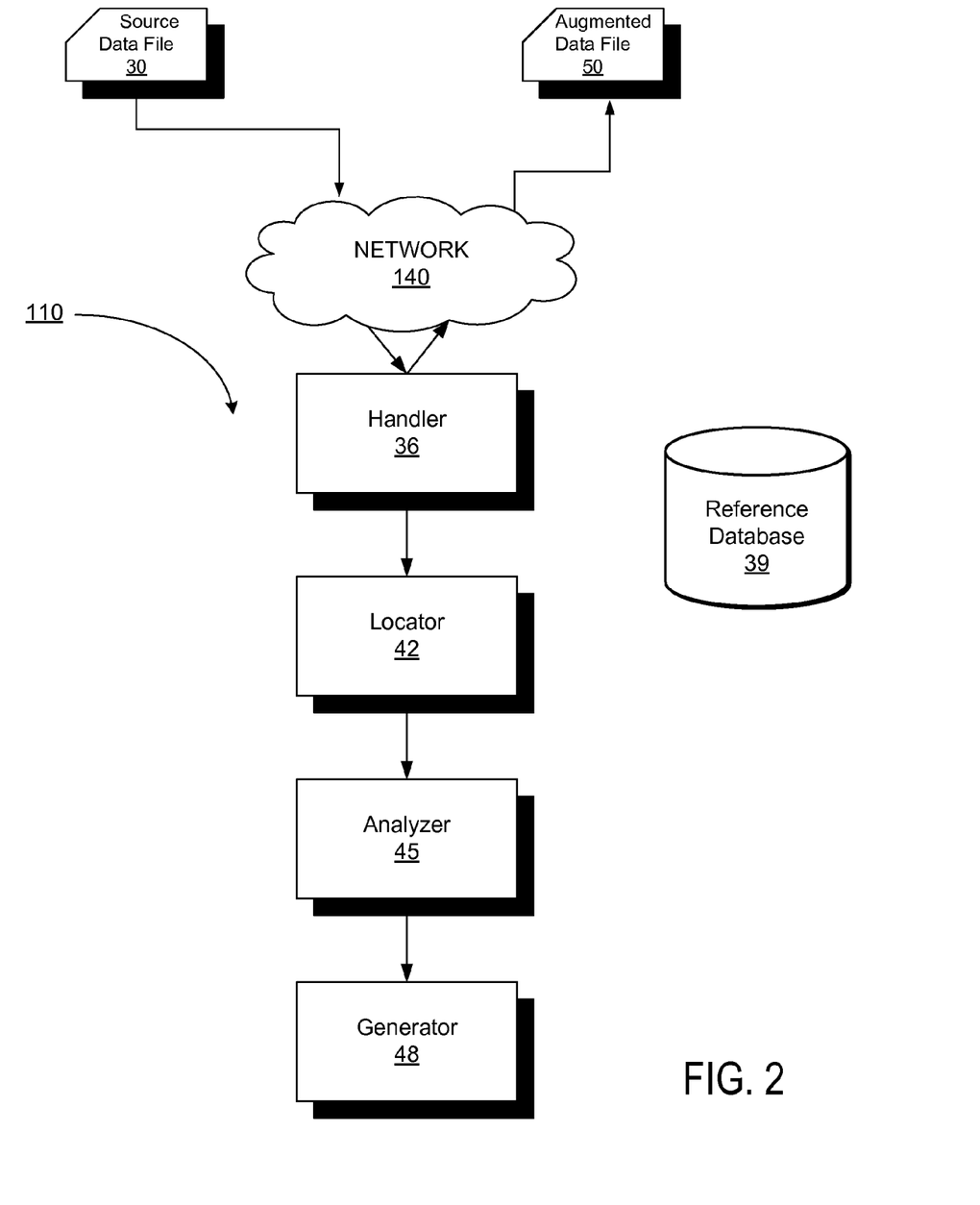
FIG. 2 is a block diagram illustrating one example architecture of an augmentation server in FIG. 1.

FIG. 2 is a block diagram illustrating one example architecture of the augmentation server 110 as described above with respect to FIG. 1. As illustrated, the augmentation server 110 includes a handler 36, a locator 42, an analyzer 45, a generator 48, and a reference database 39. The components 36 through 45 may include a software or firmware instruction that can be stored within a tangible computer readable medium (e.g., magnetic disk drive, optical disk or solid state memory such as flash memory, or random-access memory) and executed by a processor or equivalent electrical circuits, state machines, microcode, or the like.

A source data file 30 (e.g., a web page) resides on a server (e.g., a content provider 120) on a network 140 (e.g., the Internet). The handler 36 retrieves the source data file 30 for augmentation by the augmentation server 110. The locator 42 examines the retrieved source data file 30 for comparison to data in the reference database 39. In one embodiment, the locator 42 analyzes content of the source data file 30 for keywords, searches corresponding reference data in the reference database 39, and provides the keywords and the corresponding reference data to the analyzer 45. In an alternate embodiment, rather than analyzing the source data file 30 for keywords, the locator 42 retrieves a list of keywords from the reference database 39 and enumerates through the textual content of the source data file 30 for matches.

The analyzer 45 creates associations between the keywords and the corresponding reference data found by the locator 42. The generator 48 generates an augmented data file 50 by embedding the associations created by the analyzer 45 in the source data file 30. The generator 48 embeds associations by generating intelligent tags for the keywords, and augmenting the keywords with the intelligent tags. In one embodiment, an intelligent tag is an alphabetic and/or numeric string that identifies its associated keywords, and/or reference data, and optionally includes an unique identification number (hereinafter called the association ID). The generator 48 inserts the generated intelligent tags into the source data file 30 to generate the augmented data file 50. Web pages with the integrated intelligent tags are called augmented web pages. Keywords with the integrated intelligent tags are called augmented keywords. The generator 48 also stores the identified keywords and/or the associations in a database for later references.

The resulting augmented data file 50 is returned to the handler 36 to reside at a Universal Resource Locator (URL) address on the network 140 (e.g., at the content provider 120 from which the source data file 30 is retrieved). In one embodiment, the handler 36 also receives requests (or signals) from client computers 130 indicating user interactions with the augmented data file, and transmits to the client computers 130 related advertisements for display through layered augmentation. Layered augmentation is described in detail below with respect to FIGS. 3A through 3C. The handler 36 retrieves the activated keywords (e.g., from the requests), and determines one or more relevant advertisements from an advertising database (not shown) that matches the keywords and/or the associated reference data. In one embodiment, rather than transmitting the related advertisements, the handler 36 transmits addresses (e.g., URLs) of the relevant advertisements to the requesting client computer 130. The client computer 130 resolves the addresses to retrieve the advertisements.

The reference database 39 stores reference data such as types of advertisements (e.g., television advertisements), categories of advertisements (e.g., storage rental, home equity loan), and/or information about specific advertisements (e.g., associated keywords, format information, price the advertiser is willing to pay, and URL of the advertisement). The reference database 39 may be a relational database or any other type of database that stores the data, such as a flat file. In one embodiment, the reference database 39 is a web enabled reference database supporting remote calls through the Internet to the reference database 39.

The components of the augmentation server 110 can reside on a single computer system or several computer systems located close by or remotely from each other. For example, the analyzer 45 and the generator 48 may reside on separate web servers, and the reference database 39 may be located in a dedicated database server. In addition, any of the components or sub-components may be executed in one or multiple computer systems.

Overview of Layered Augmentation Methodology

Web pages (or web browsers) can provide additional information to viewers. For example, when a user places a mouse over a link label of a hyperlink, a web browser displays the associated destination URL (e.g., on a status bar of the web browser). As another example, when a user places a pointer over a keyword, the web browser may generate a pop-up dialog box, and display relevant information (e.g., an explanation of the keyword). The process of providing additional information to web page viewers is called augmentation.

A keyword (or phrase) often has multiple aspects of related information, each having multiple aspects of related information. For example, the key phrase "digital camera" is related to its history, underlying technology, and available products and services. A specific product related to digital camera has related information such as product description, customer review, and competing products. Usually only one aspect of the related information is provided through augmentation due to limited display space.

Multiple aspects of related information can be arranged and provided to viewers through layered augmentation. Each aspect of related information can be assigned to one specific layer of the layered augmentation. Viewers can navigate among the multiple aspects of related information by accessing the different layers of the layered augmentation without leaving the web page. For example, the augmented information can be displayed in a multi-layered dialog box. A viewer can navigate among different layers by selecting associated tabs displayed in the dialog box in which each tab is associated with a layer. Alternatively, the multiple layers may be stacked in a manner similar to windows in Microsoft Windows™ Operating System. The stacked layers may be arranged in a horizontal, vertical, or cascade style, showing a small exposed portion of each layer, such as a title area or a corner area. Navigation between each layer in the stack can be through selection of that small exposed portion of the layer within the stack. The process of providing additional information (or resources) through multi-layered dialog box and the multi-layered dialog box are collectively called layered augmentation.

Figure 3A:
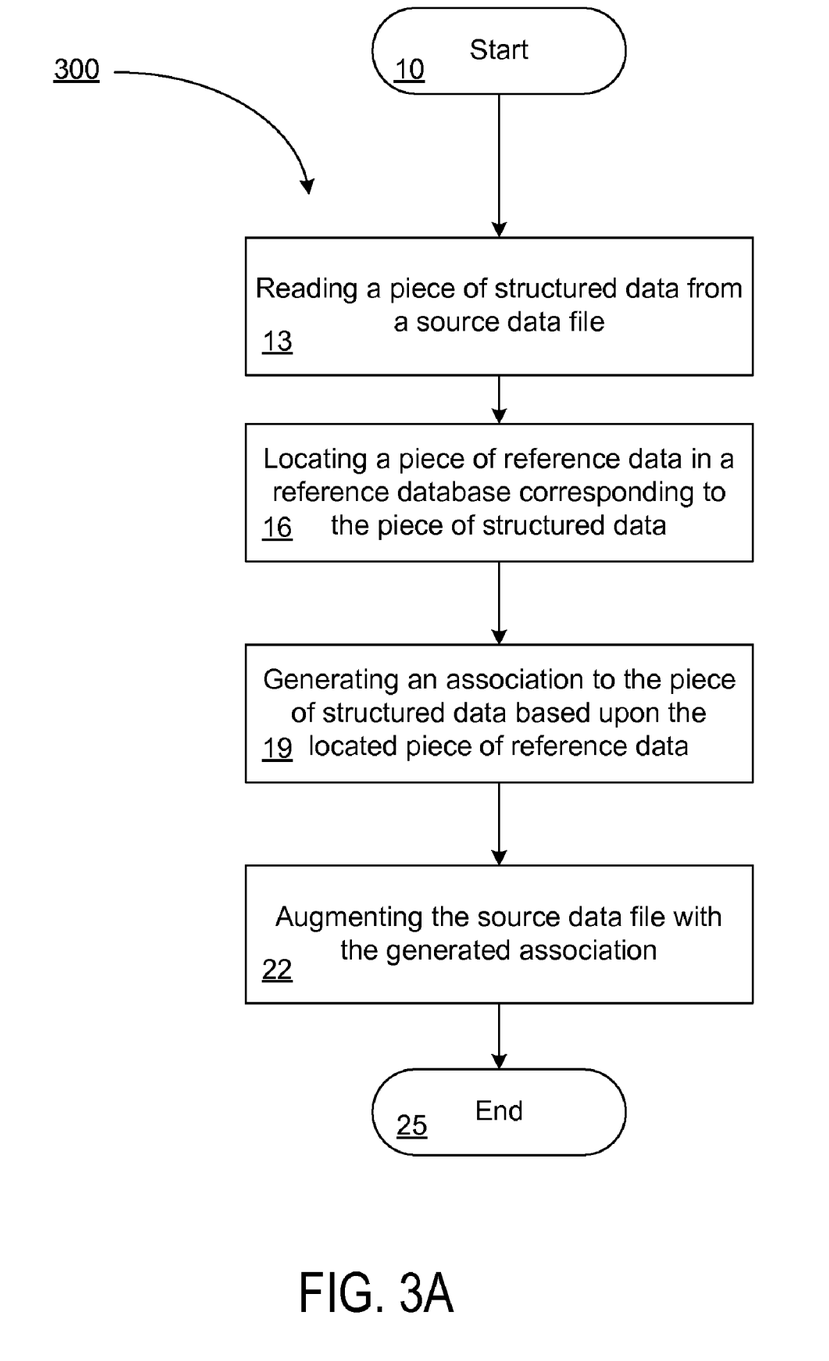
FIGS. 3A through 3C are flowcharts collectively illustrating an example method for augmenting source data files with layered augmentation.
Figure 3B:
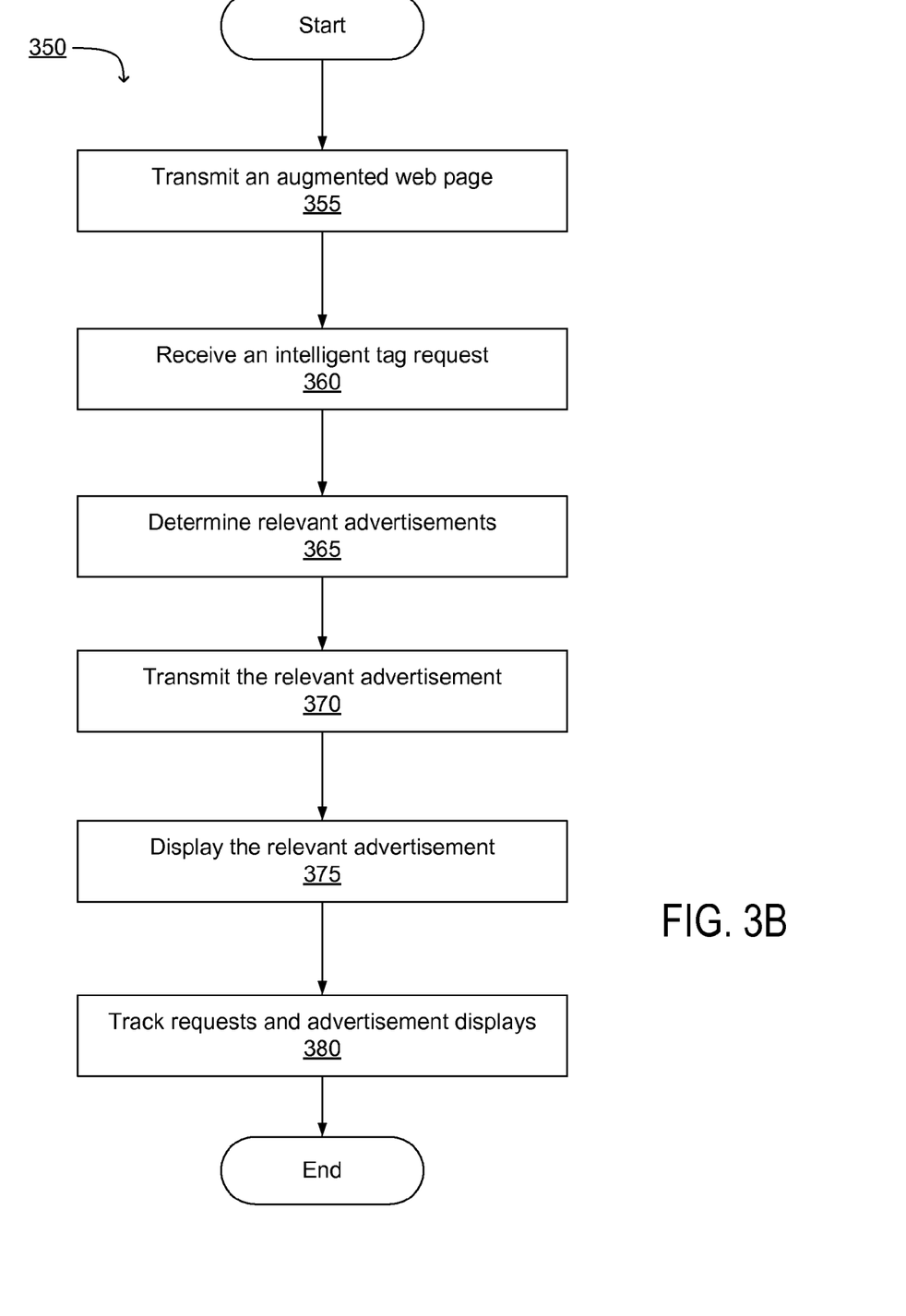
Figure 3C:
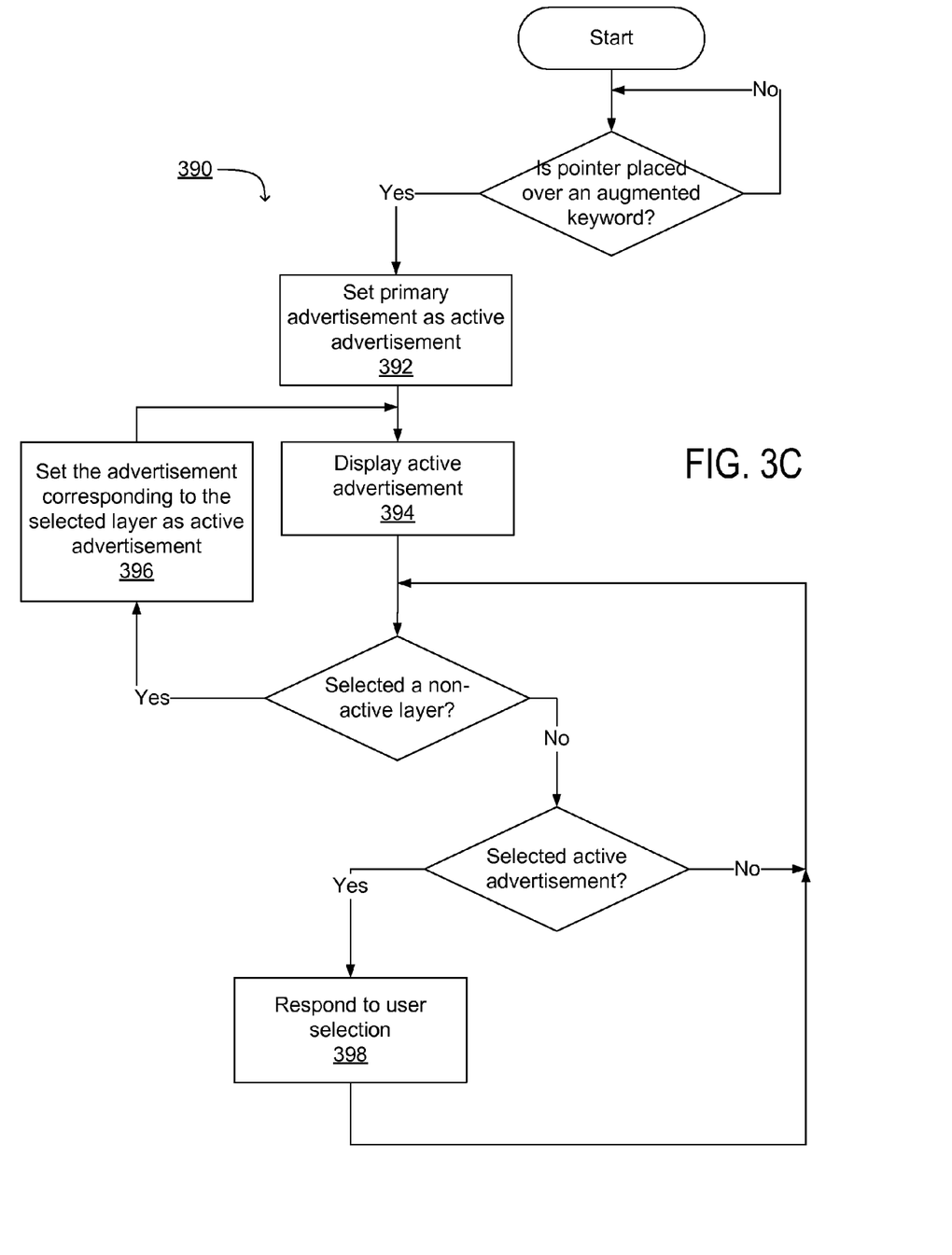

FIGS. 3A through 3C are flowcharts collectively illustrating an example process (or method) for augmenting web pages and providing viewers of augmented web pages with related advertisements through layered augmentation. In one embodiment, the illustrated method (or either of its sub-methods 300, 350, and 390) is implemented in a computing environment such as the computing environment 100. One or more portions of the method may be implemented in embodiments of hardware and/or software or combinations thereof.

By way of example, the illustrated method may be embodied through instructions for performing the actions described herein and such instrumentations can be stored within a tangible computer readable medium and are executable by a processor. Alternatively (or additionally), the illustrated method may be implemented in modules like those in the augmentation server 110 described above with respect to FIG. 2 and/or other entities such as the content providers 120 and/or the client computers 130. Furthermore, those of skill in the art will recognize that other embodiments can perform the steps of the illustrated method in different order. Moreover, other embodiments can include different and/or additional steps than the ones described here.

FIG. 3A illustrates an example process (or method) 300 for augmenting web pages. As illustrated in FIG. 3A with reference to components of the augmentation server 110 in FIG. 2, at an appropriate starting terminus 10, the method 300 begins by reading a piece of structured data from a source data file 30 at a block 13 (e.g., through the handler 36). The source data file 30 may be one designated by an input uniform resource locator (URL) address or by any suitable means to designate a resource. Upon opening the source data file 30, the method 300 may optionally identify the type of content on the page with a content identifier such as a MIME header (e.g., through the locator 42). In one embodiment of the invention, the method 300 merely searches for the presence of a piece of reference data (e.g., through the locator 42), either informed by the content identifier or by simply searching an occurrence of a piece of well structured data (e.g., a keyword) within the source data file. In addition, once the source data file 30 is open, the method 300 has its content available for comparison to reference data in the reference database 39. Other methods and examples to read a piece of structured data from the source data file are described in U.S. application Ser. No. 12/033,539, U.S. Pat. No. 7,853,558, filed on Feb. 19, 2008, the content of which is incorporated by reference in its entirety.

At a block 16, the method 300 locates one or multiple pieces of reference data in the reference database 39 corresponding to the piece of structured data read in the source data file 30 (e.g., through the locator 42). In one embodiment, the locator 42 searches for reference data in the reference database 39 that match the piece of structured data by making function calls to the reference database 39. In one embodiment, the structured data are keywords, and the reference data also contain keywords.

Keywords are a facile and efficient means of generating layered augmentation. In addition to or instead of using keywords, one embodiment uses a "fuzzy expert" or a neural network analysis of the source data file 30, such as by a natural language search of the source data file 30 to generate a distinct identifier for the content in the source data file 30. One advantage of a natural language search is the ability to better place content in context making links more contextually appropriate, for instance, security might relate to security of a physical plant such as security of a residence in one source data file 30 in one context and security of a website in another. In one embodiment, the method 300 determines a context of the keywords and/or the source data file 30 based on statistical modeling (e.g., through the locator 42). For example, a context can be assigned a pre-defined set of terms which acts as a fingerprint for the context (hereinafter called context fingerprint). The locator 42 can compare the context fingerprints associated with a collection of contexts with the terms within the source data file 30 to determine a percentage match for each context in the collection. Where a high percentage match is achieved (e.g., exceeding a pre-defined percentage match threshold), the locator 42 determines that the associated context is the context for the source data file 30. Alternatively or in conjunction, the locator 42 may determine the context associated with the highest percentage match as the context for the source data file 30. The context can be used to locate corresponding reference data and/or related resources.

At a block 19, the method 300 generates an association to the piece of structured data based upon the located matching reference data (e.g., through the analyzer 45). In one embodiment, a piece of reference data includes an identifier such as a keyword, a context, a unique identification number, and/or associated URL address(es) of intended destination resource(s) based upon the occurrence of the corresponding keywords in the source data file 30. Generating an association means to associate the piece of structured data located in the source data file 30 with the located reference data in the reference database 39. The generated association might optionally include additional identification codes such as an association ID. The method 300 then augments the original source data file 30 with the generated association at a block 22 to generate an augmented data file 50 (e.g., through the generator 48).

In one embodiment, the method 300 expresses the association as intelligent tags (e.g., through the generator 48). The method 300 generates intelligent tags for the located keywords and tags the keywords with the generated intelligent tags. The intelligent tags contain information about the associated keywords such as the keyword and related context, and information about the associated reference data such as IDs that uniquely identify the reference data in the reference database 39. For example, the intelligent tags may contain requirement (or preference) information about advertisements (or other types of resources) to be associated with the keyword, such as types of advertisements and a minimum advertisement fee. In one embodiment, the intelligent tags also format the augmented keywords differently than the other textual content in the augmented web pages. Having generated the augmented data file 50, the method 300 then terminates at a block 25.

In one embodiment, the augmentation server 110 (or the content providers 120) also augments the web pages by including computer code (hereinafter called client code) to monitor and report viewers' interactions with the augmented keywords. The computer code can be in any computer language, such as JavaScript. Additional functions of the client code are described in detail below with respect to FIGS. 3B and 3C.

The augmented data file 50 can be delivered (or transmitted) to client computers 130 for display through a web browser to viewers to provide related resources through layered augmentation. The delivery of the augmented data file 50 and the process to provide layered augmentation is described in detail below with respect to FIGS. 3B and 3C. For purpose of illustration, the method is described in terms of web pages augmented with advertisements, even though the disclosed embodiments apply to other types of augmented data file and resources.

Referring now to FIG. 3B, a flowchart illustrating an example process (or method) 350 for providing layered augmentation to viewers of augmented web pages. As illustrated, the method 350 transmits 355 an augmented web page to a client computer. For example, a user of the client computer 130 may enter the URL of an augmented web page (or the corresponding original web page) in the address bar of a conventional web browser (e.g., Microsoft Internet Explorer™, Mozilla Firefox™, or Apple Safari™). The web browser of the client computer 130 (hereinafter called the client web browser) resolves the URL and transmits a request for the web page to a corresponding content provider. Responding to the request, the content provider transmits 355 the augmented web page to the client web browser for display. In one embodiment, the client web browser displays augmented keywords in a double underline style and/or in a color distinctive from text that is not augmented in the augmented web page.

The method 350 receives 360 an intelligent tag request from the client computer 130. As described above with respect to FIG. 3A, the augmented web page contains client code that monitors user interactions with augmented keywords. In one embodiment, if the user moves a pointer (e.g., a pointer controlled by a mouse, navigation button, or touchpad) over (a mouse-over) an augmented keyword (the activated keyword), the client code (which may be integrated with the web browser, for example, as a plug-in applet) generates an intelligent tag request and transmits the request to the augmentation server 110. The request indicates the mouse-over user activity to the augmentation server 110. The request may contain information that uniquely identifies the activated keyword (e.g., an association ID), and/or other information such as the activated keyword itself.

The method 350 determines 365 advertisements relevant to the activated keyword for the received request based on the keyword and/or the associated reference data. In one embodiment, the augmentation server 110 extracts the keyword and/or related context from the request, retrieves the associated reference data from the reference database 39, and determines 365 the relevant advertisements by searching in an advertisement database using the keyword and/or requirements set forth in the associated reference data (e.g., advertisement category, context, fee requirements, etc.).

In one embodiment, the method 350 determines 365 the advertisements that match the best (e.g., matching the activated keyword and/or satisfies the most number of reference requirements) as the relevant advertisements. In another embodiment, the method 350 determines 365 relevant advertisements based on a context of the augmented web page and/or the activated keyword. For example, for a key phrase "digital camera" in an article about digital camera, the method 350 may determines the following resources as relevant: a product review of a digital camera in CNET.com, a collection of user reviews at Buy.com, and a selection of similar digital cameras. The context can be determined when the activated keyword is identified in method 300.

In one embodiment, the method 350 determines a sequence for the related advertisements. The top advertisement in the sequence (also called the default advertisement or the primary advertisement) is the advertisement being displayed on the top layer of the layered augmentation. The lower ranked advertisements (also called secondary advertisements) are made available on lower layers of the layered augmentation. In one embodiment, the method 350 uses a bidding system to determine related advertisements sequence. For example, for a key phrase "digital camera," there may be multiple related advertisements (e.g., advertisements for different brands or models of digital cameras), each having a bid (or budget or cost) for the key phrase. The method 350 may determine a sequence of the advertisements based on their bids, the one with the highest bid ranked the highest and so on.

In another embodiment, the method 350 may determine the sequence of multiple advertisements based on factors other than bidding prices. For example, the method may consider factors such as relationships among the multiple advertisements (e.g., prioritizing video advertisements over text ones), prior user interactions with the advertisements (e.g., prioritizing advertisements with higher interacting rate), and contexts of the augmented keyword (e.g., prioritizing advertisements from retailers or service providers having branches near a geographical context of the keyword and/or the augmented web page, or geographic locations of a substantial portion of viewers of the web page).

Further, specific sequences may be set for specific keywords and/or parties (e.g., content providers, advertisers, users). For example, if the keyword(s) is a music artist (or band, album) name, the method 350 may make available his songs (e.g., playback through an embedded music player) on the top layer and other resources on lower layers. As another example, if the keyword(s) is a location name (e.g., Yellowstone National Park), the method 350 may make available the relevant map (e.g., MapQuest™ Map) on the top layer. As noted above, the resources made available through the layered augmentation need not to be advertisements and can be related contents such as related articles, videos, images, music, to name only a few. For example, a content provider may specify that the layered augmentations in its web pages make available a set of links to its other relevant web pages (e.g., within the same website) where the keyword(s) being augmented is cross-indexed.

In one embodiment, viewers can set their preferences to determine a preferred sequence for the layered augmentation. For example, a viewer may prefer video advertisements while another may disfavor them (e.g., due to bandwidth constrains at receiving device). As a result, the method 350 may place video advertisements higher on a sequence for the first viewer, while not consider video advertisements for augmentation for the second viewer. Viewer preferences can be stored in a database such as the reference database 39 along with other viewer related data (e.g., profile data).

The method 350 transmits 370 the relevant advertisements to the client computer 130 for display. In one embodiment, the method 350 retrieves the advertisements from an advertisement database, and transmits 370 them to the client web browser (or the client computer) for display. Alternatively, the method 350 may transmit references of the advertisements (e.g., their URLs) to the client web browser for retrieval.

In one embodiment, the method 350 generates computer code (hereinafter called the advertisement code) to facilitate user interaction with the advertisements. Similar to the client code, the advertisement code can be in any computer language, such as JavaScript. The advertisement code may display the relevant advertisements in a multi-layered dialog box (or popup box) when the viewer moves a pointer over the activated keyword. The method 350 transmits the generated advertisement code along with the related advertisements to the client web browser. In one embodiment, the advertisement code is a part of the client code, and is integrated in the augmented web page when the page is generated.

The client web browser displays 375 the relevant advertisements in a layered dialog box proximate to the activated keywords (or the position where the mouse-over is occurring) as an in-page overlay. In one embodiment, the client web browser utilizes the advertisement code to display the advertisements in a multi-layered dialog box. The advertisements are displayed according to their sequence. In one embodiment, only the top advertisement is displayed and the lower ranked advertisements are represented by selectable tabs. An example process of the operation of the advertisement code and the client code is described in detail below with respect to FIG. 3C.

Referring now to FIG. 3C, a flowchart illustrating an example process (or method) 390 of the client code and/or the advertisement code. As illustrated, the method 390 determines whether a pointer is positioned over an augmented keyword (the activated keyword), and if so, sets 392 the primary advertisement as the active advertisement, and displays 394 the active advertisement in a multi-layered dialog box overlaying the augmented web page in a position proximate to the activated keyword or the mouse-over. The multi-layered dialog box also displays multiple selectable (e.g., clickable) tabs representing the lower layers. The viewer can select a tab to request the multi-layered dialog box to display the corresponding layer. If the user selected a tab, the method 390 sets 396 the advertisement corresponding to the selected layer as the active advertisement and displays 394 it in place of the previously displayed advertisement.

The viewer can also interact with the currently displayed advertisement by selecting the advertisement. If the viewer selects the advertisement, the method 390 responds 398 to the user selection based on the nature of the user selection and the configuration of the advertisement. For example, if the user clicks on the active advertisement, the method 390 redirects the web browser to a web page related to the active advertisement. Alternatively, if the user drags a scrollbar displayed on the dialog box, the method displays different portions of the active advertisement as the user drags along the scrollbar. In one embodiment, if the viewer moves the pointer away from the activated keyword and/or the multi-layered dialog box for an extended period of time, the method 390 hides the dialog box.

Referring back to FIG. 3B, in one embodiment, rather than displaying multiple advertisements, the method 350 displays multiple aspects (or portions) of the same advertisement in the multi-layered dialog box. For example, the multi-layered dialog box may display an image and brief description of a product, and present two tabs, one for user reviews and the other for playback of a television advertisement of the product. The viewer may interact with the advertisement through the multi-layered dialog box without having to navigate away from and otherwise leave the current web page the viewer is interacting with in the web browser. For example, if the advertisement contains video, the multi-layered dialog box may overlay the video with video controls (e.g., forward, rewind, play/pause, volume, etc.). The multi-layered dialog box may also provide functional resources such as web searches, enabling viewers to conduct web searches and/or review search results without leaving the augmented web page.

The method 350 tracks 380 the received requests, the advertisements displays, and/or the user's interactions with the advertisements. These activities may be logged in a database (e.g., the reference database 39) or reported to another device or person (e.g., via electronic mail).

Example Process

Figure 4A:
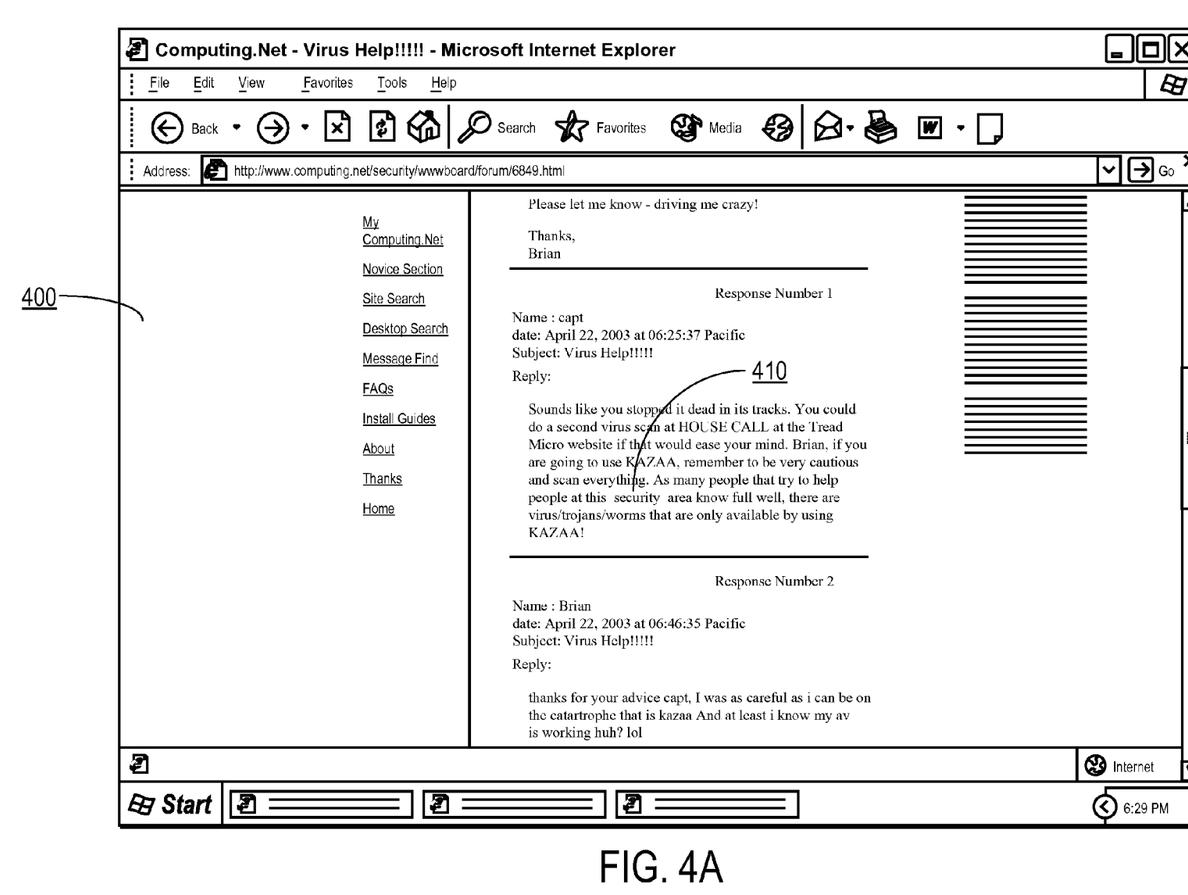
FIGS. 4A through 4E are screenshots illustrating a web page, its corresponding augmented web page, and a viewer's user experience interacting with the augmented web page according to one embodiment of the present disclosure.

The methods described above with respect to FIGS. 3A through 3C are illustrated below in an example together with accompanying screenshots in FIGS. 4A through 4E. Initially, the augmentation server 110 retrieves a web page 400 for augmentation. The web page 400 may contain textual content of any subject. FIG. 4A shows an example of the web page 400 as displayed in Microsoft Internet Explorer™. As shown in FIG. 4A, the web page 400 is retrieved from website www.computing.net and contains a paragraph about computer virus.

The augmentation server 110 reads 13 the web page 400 for keywords. The augmentation server 110 identifies the keyword "security" 410 for layered augmentation. The augmentation server 110 locates 16 a piece of reference data matching the keyword "security" 410 and determines a context of computer security for the keyword 410. The piece of reference data includes an advertisement category for computer security services. The augmentation server 110 generates 19 an association of the keyword "security" 410 and the located piece of reference data.

Figure 4B:
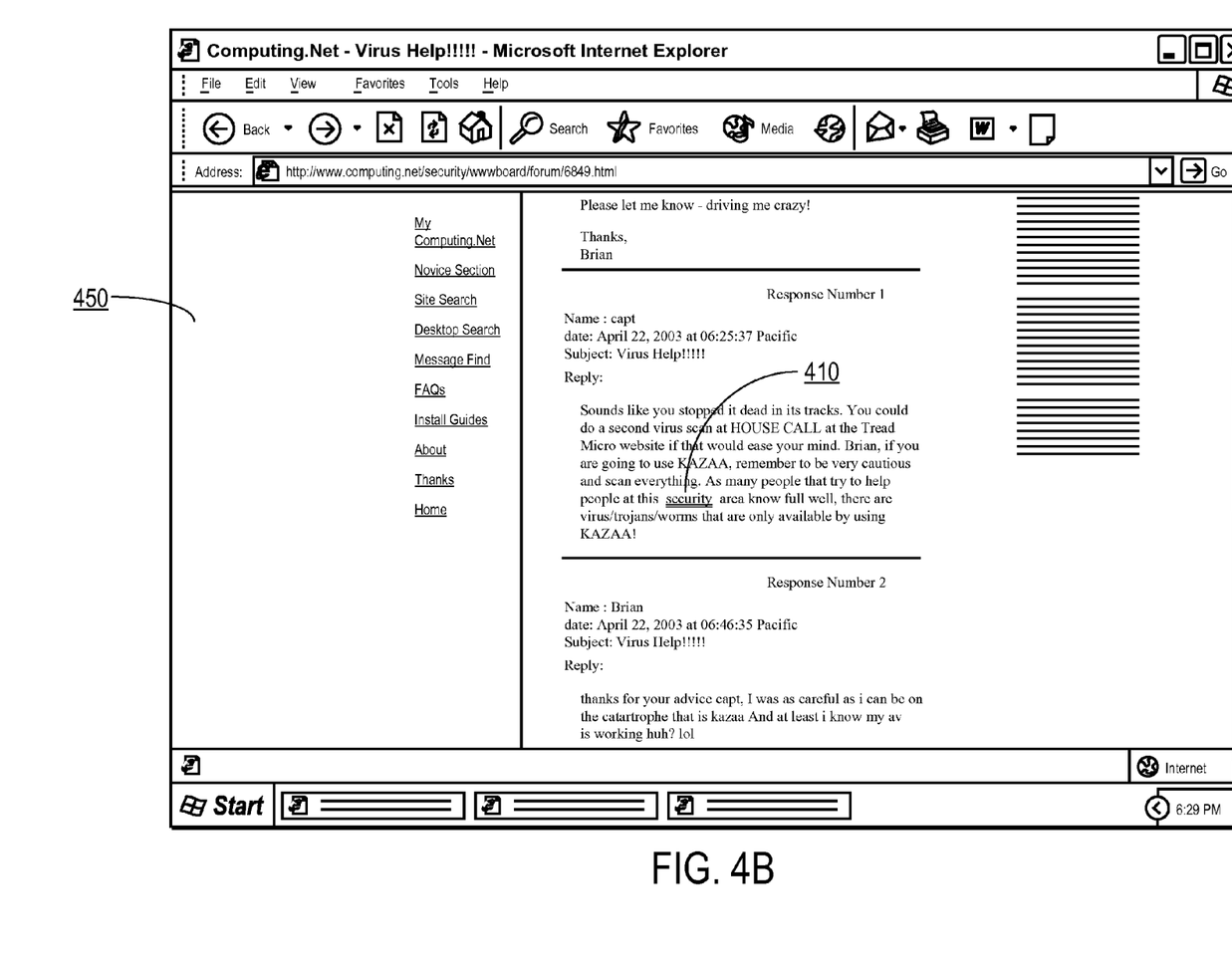

The augmentation server 110 augments 22 the web page 400 by generating an intelligent tag encoding the generated association, and integrating the intelligent tag in an augmented web page 450. The augmentation server 110 also includes in the augmented web page 450 JavaScript code (client code) that captures user interactions with the augmented keyword 410.

A web browser running on a client computer 130 retrieves the augmented web page 450 and displays it to a user (e.g., responding to the user entering an URL of the web page 400 or 450 in the address bar of the web browser). FIG. 4B illustrates a screenshot of the augmented web page 450 as displayed on an Internet Explorer™ web browser after it is retrieved by the browser. It is noted that in FIG. 4B the augmented keyword 410 is displayed in a double underline style to distinguish from conventional hyperlinks that are single underlined.

Subsequently, the user may move a pointer (e.g., controlled by a mouse, stylus, or touchpad) over the double underlined augmented keyword 410 (the activated augmented keyword). This user action is also referred to as a mouse-over. Detecting the mouse-over, the embedded JavaScript code (the client code) in the augmented web page 450 (or the web browser) generates an intelligent tag request that uniquely identifies the activated augmented keyword 410 and/or the related context, and transmits the request to the augmentation server 110. The augmentation server 110 receives 360 the request, retrieves stored association of the keyword 410, and determines 365 relevant advertisements by searching for advertisements corresponding to the keyword 410 and/or the related context in an advertising database. In the present example, the augmentation server 110 determines 365 that an advertisement for Cisco security center is the relevant advertisement associated with the augmented keyword 410.

The augmentation server 110 determines a sequence of various parts of the Cisco advertisement and/or other relevant advertisements. In the present example, the augmentation server 110 determines that a description of the Cisco security center ranks top in the sequence, followed by its customer reviews, and a list of competing services.

The augmentation server 110 transmits 370 the related advertisement(s) back to the web browser for display. The augmentation server 110 also transmits JavaScript code (advertisement code) that enables layered representation of the transmitted advertisements.

Figure 4C:
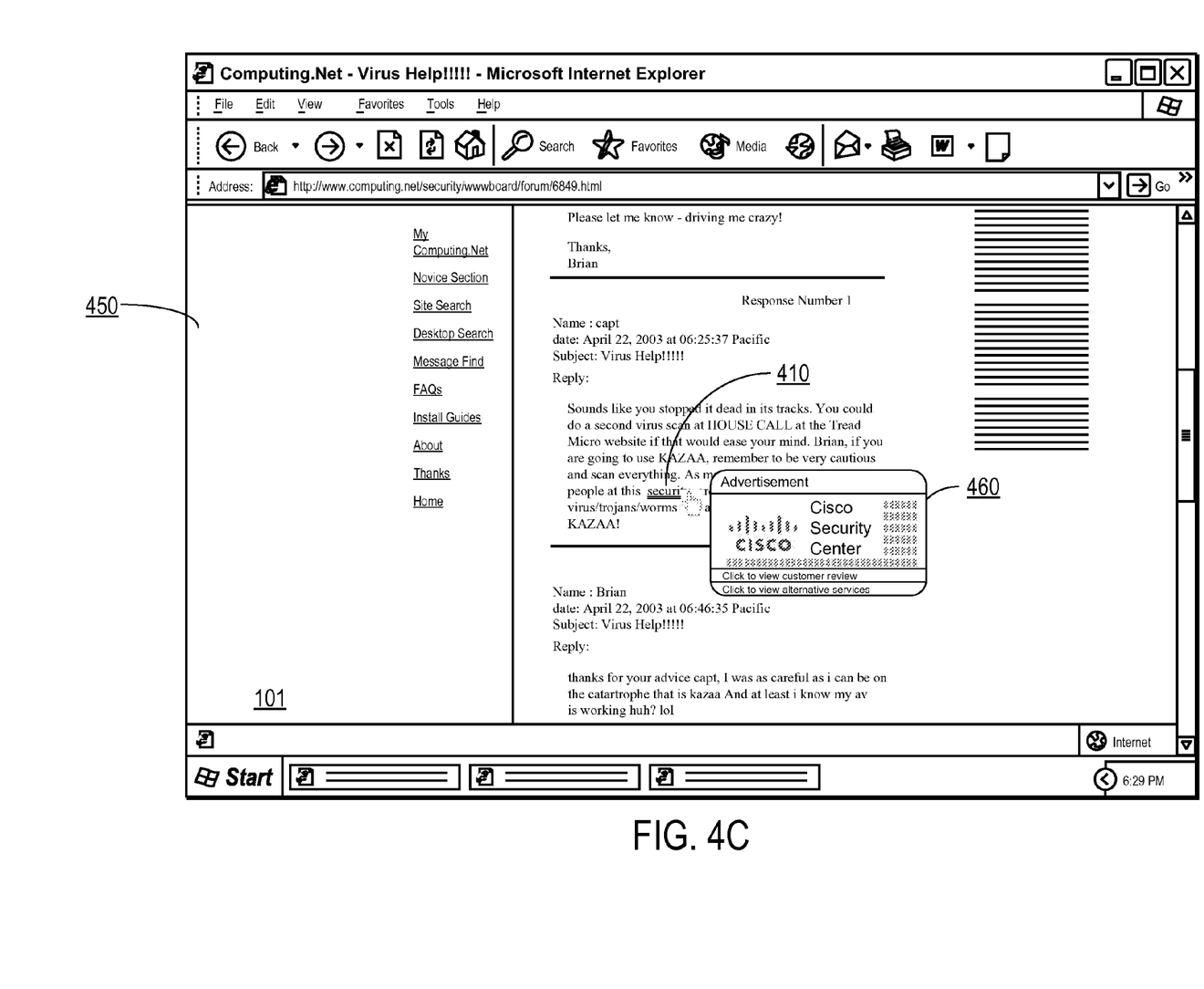

The web browser (or the advertisement code) displays 375 the received advertisement(s) as an overlay in a multi-layered dialog box in proximity to the keyword 410 or the location where the mouse-over occurred. As illustrated in FIG. 4C, the user has moved a mouse pointer over the keyword 410. As a result, the web browser receives advertisements related to the keyword "security" 410 and displays them in a multi-layered dialog box 460 proximate to the pointer.

As illustrated, the multi-layered dialog box 460 displays an advertisement about CISCO security center. On the bottom of the multi-layered dialog box 460 are two tabs labeled "Click to view customer review" and "Click to view alternative services," respectively. Note that this is consistent with the sequence of the advertisements (and/or advertisement portions) determined by the augmentation server 110. The user can navigate the advertisements within the multi-layered dialog box 460 by clicking the labeled tabs. The user can also visit the corresponding advertiser's web page by clicking the advertisement. While the user navigates within the multi-layered dialog box 460, the augmented web page 450 remains as the current web page displayed in the client web browser. The user can quickly resume browsing the rest of the augmented web page 450.

Figure 4D:
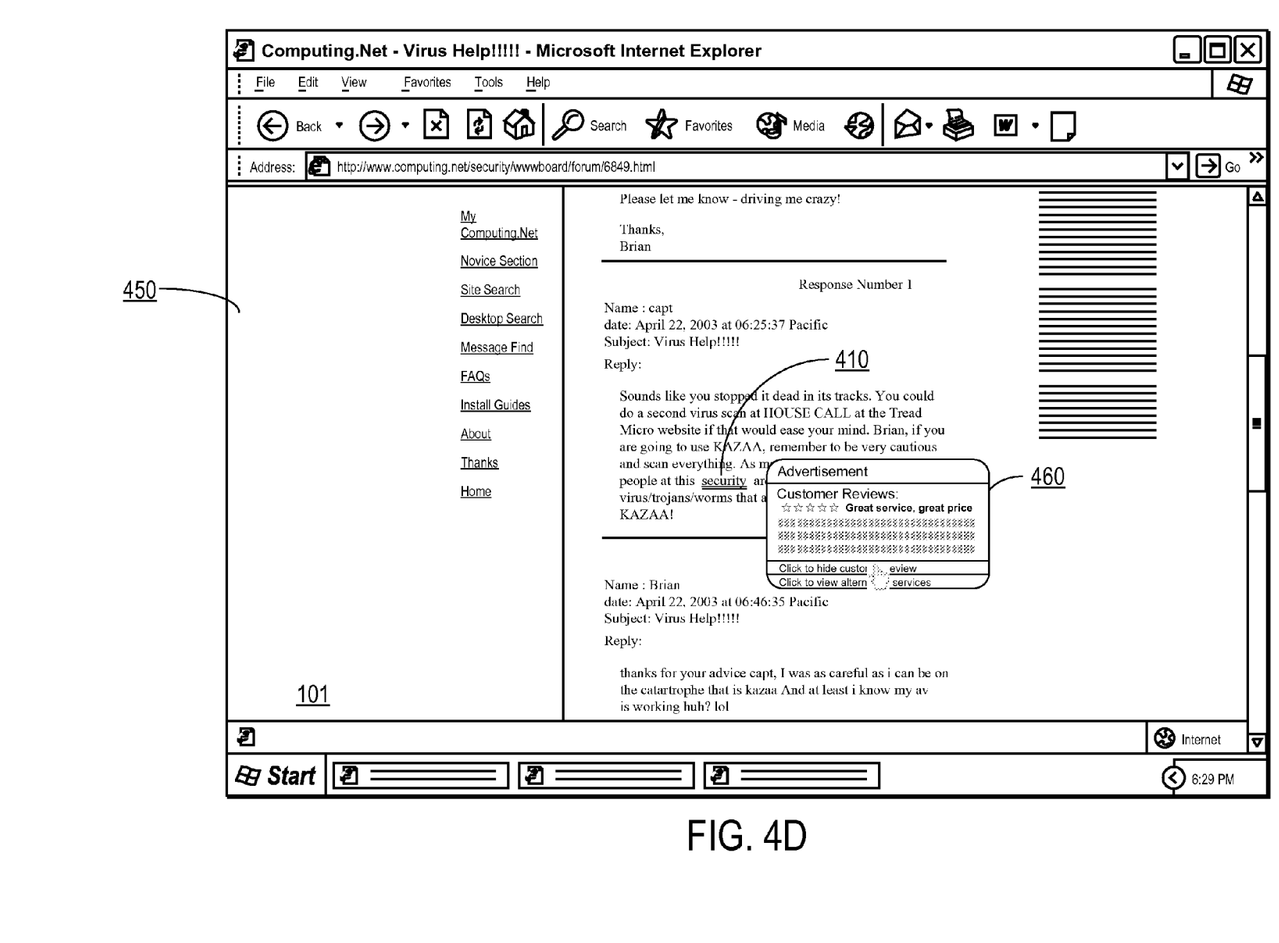

As illustrated in FIG. 4D, when the user clicks (or mouse-over) the tab labeled "Click to view customer review," the multi-layered dialog box 460 displays customer reviews for Cisco security center. It is noted that the label on the tab representing customer review changes to "Click to hide customer review." The user can click the tab to resume viewing the previous advertisement for Cisco security center.

Figure 4E:
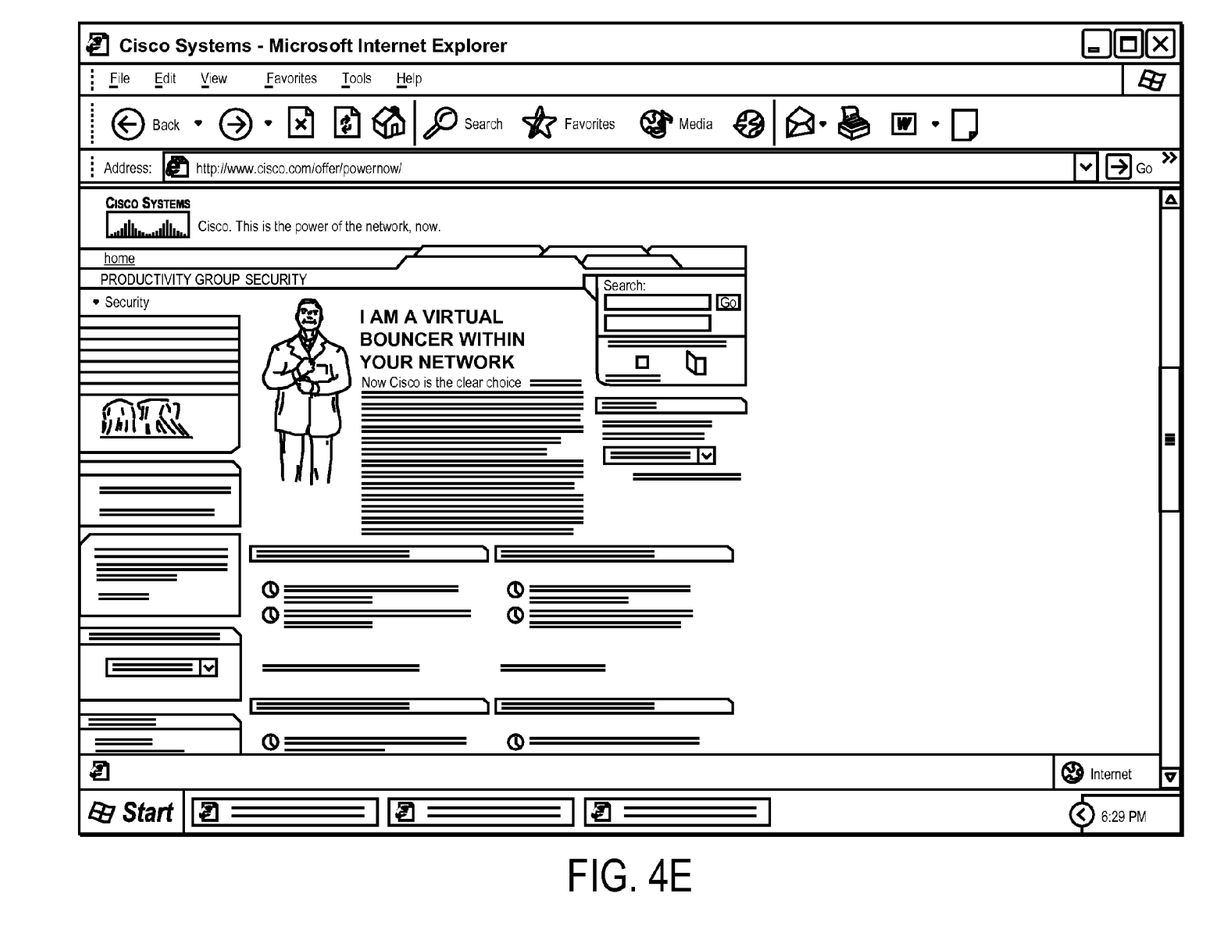

As illustrated in FIG. 4E, when the user clicks the Cisco security center advertisement, the advertisement code redirects the client web browser to the advertiser's web page, in this case a web page related to Cisco security center.

Alternate Embodiments

In one embodiment, the augmentation server 110 delivers rich media content without augmenting web pages ahead of time. The augmentation server 110 (or other entities) may install a plug-in module in the client web browser. The plug-in module monitors the client's browsing activity and transmits related information (e.g., the URL of the displayed web page) to the augmentation server 110 in real time (or "on-the-fly"). The augmentation server 110 may retrieve the web page and analyze it for keywords and/or related contexts in real time. The augmentation server 110 transmits the information (e.g., the identified keywords) to the client web browser. If the user mouse-over one of the identified keywords (the activated keyword), the plug-in module sends a signal to the augmentation server identifying the activated keyword. The augmentation server 110 may determine and transmit relevant advertisements to the client web browser for display in a manner similar to the one described above with respect to FIGS. 4C through 4E.

In another embodiment, the web pages can be augmented on the client side (e.g., via plug-in modules in the client web browser) in a manner similar to the one described above with respect to FIGS. 3A and 3B.

In another embodiment, in addition to augmenting keywords (and phrases), the present invention can augment non-textual content (e.g., image, video), and/or overlay layered augmentation on content elements such as images and videos. For example, the metadata associated with an image (or video) can be examined to determine keywords and/or contexts related to the subject matter of the image. The present invention can augment the image with layered augmentation in a manner similar to the one described above with respect to FIGS. 3A and 3B. The layered augmentation can include a set of tabbed overlays and, once engaged with, can display appropriate advertising message or other alternate content on top of the image.

One of ordinary skill in the art will readily recognize that the described system and method are not limited to augmenting keywords in web pages with advertisements and can be applied to augment any types of visual elements in any types of documents with any types of rich media content. Examples and detailed descriptions of an approach to augment still images on web pages with relevant additional information are provided in U.S. patent application Ser. No. 12/033,539, U.S. Pat. No. 7,853,558, the disclosure of which is incorporated by reference in its entirety.

Advantages of the disclosed embodiments include providing content providers with additional channels for delivering relevant advertisements and other content to viewers. Because the relevant resources are presented in a multi-layered dialog box, viewers can access more relevant resources in a well-organized manner. Because the augmented data is displayed as an overlay of the current web page, the disclosed embodiments in essence establish a third dimension (e.g., a "z-axis") to present information (the first and second dimensions being the length (e.g., a "x-axis") and width (e.g., a "y-axis") of the web page), enabling viewers to access additional relevant content without leaving the current web page. This feature is beneficial for devices with limited screen space, for example, mobile computing devices (e.g., hand-held computers) or conventional computer screens having many active windows that are simultaneously displayed. The disclosed embodiments also enhance viewers' web browsing experience by providing relevant content overlays without the need to leave their current web page to augment the information to provide for a user.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for augmenting content in web pages with relevant resources through layered augmentation. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for augmenting web pages with related resources through layered augmentation, the method comprising:
- analyzing a web page to identify a keyword in the web page;
- locating a piece of reference data from a reference database matching the identified keyword;
- generating an association of the located piece of reference data and the keyword;
- embedding the association in an augmented web page corresponding to the web page;
- receiving a request from a client computer corresponding to a pointer being positioned over the keyword in the augmented web page; and
- responsive to receiving the signal:
  - determining a plurality of resources relevant to the keyword by searching for the plurality of resources using the located piece of reference data in a resource database, and
  - transmitting the plurality of resources to the client computer for display in a multi-layered dialog box, such that a viewer can access the plurality of resources by interacting with the multi-layered dialog box without leaving the augmented web page.

2. The method of claim 1, wherein the plurality of resources comprise one of an advertisement, a video, or a Flash.

3. The method of claim 1, wherein the keyword comprises a key phrase.

4. The method of claim 1, wherein embedding the association in the augmented web page corresponding to the web page comprises embedding computer code in the augmented web page for monitoring user pointer movement on a display of the augmented web page.

5. The method of claim 1, wherein the multi-layered dialog box is displayable as an overlay in an area proximate to the keyword simultaneous to the pointer being positioned over the keyword.

6. The method of claim 1, further comprising:
- tracking the request or the plurality of resources.

7. The method of claim 1, further comprising:
- determining a context of the keyword in the web page,
- wherein determining the plurality of resources relevant to the keyword further comprises searching for the plurality of resources using the context of the keyword in the resource database.

8. The method of claim 1, further comprising determining a sequence of the plurality of resources based on at least one of the following: a bid for one of the plurality of resources, a relationship between two of the plurality of resources, prior user interaction with one of the plurality of resources, and a context of the keyword.

9. The method of claim 1, wherein the multi-layered dialog box operates according to a method comprising:
- determining a sequence of the plurality of resources;
- setting a top-ranked resource of the plurality of resources based on the sequence as an active resource;
- displaying the top-ranked resource;
- representing lower-ranked resources of the plurality of resources by selectable tabs;
- responsive to a user selection of one of the selectable tab:
  - setting a corresponding resource as the active resource, and
  - displaying the active resource; and
- responsive to a user selection of the active resource, interacting with the active resource based on the user selection.

10. A computer readable medium with stored instructions, the instructions when executed by a processor cause the processor to perform a method comprising:
- analyzing a web page to identify a keyword in the web page;
- locating a piece of reference data from a reference database matching the identified keyword;
- generating an association of the located piece of reference data and the keyword;
- embedding the association in an augmented web page corresponding to the web page;
- receiving a request from a client computer corresponding to a pointer being positioned over the keyword in the augmented web page; and
- responsive to receiving the signal:
  - determining a plurality of resources relevant to the keyword by searching for the plurality of resources using the located piece of reference data in a resource database, and
  - transmitting the plurality of resources to the client computer for display in a multi-layered dialog box, such that a viewer can access the plurality of resources by interacting with the multi-layered dialog box without leaving the augmented web page.

11. An augmentation system for augmenting web pages with related resources through layered augmentation, the system comprising:
- a handler for retrieving web pages and transmitting augmented web pages;
- a locator for analyzing a web page to identify a keyword and a piece of reference data from a reference database matching the identified keyword;
- an analyzer for generating an association of the identified keyword and the piece of reference data,
- a generator for generating an augmented web page corresponding to the web page by embedding the association in the augmented web page;
- an advertisement deliver module for receiving a request from a client computer corresponding to a pointer being positioned over the keyword in the augmented web page, responsive to receiving the signal, determining a plurality of resources relevant to the keyword by searching for the plurality of resources using the associated piece of reference data in a resource database, and transmitting the plurality of resources to the client computer for display in a multi-layered dialog box, such that a viewer can access the plurality of resources by interacting with the multi-layered dialog box without leaving the augmented web page.

* * * * *